9 Sheets—Sheet 2.
M. T. NEALE.
Grain-Binder.
No. 225,944 Patented Mar. 30, 1880.
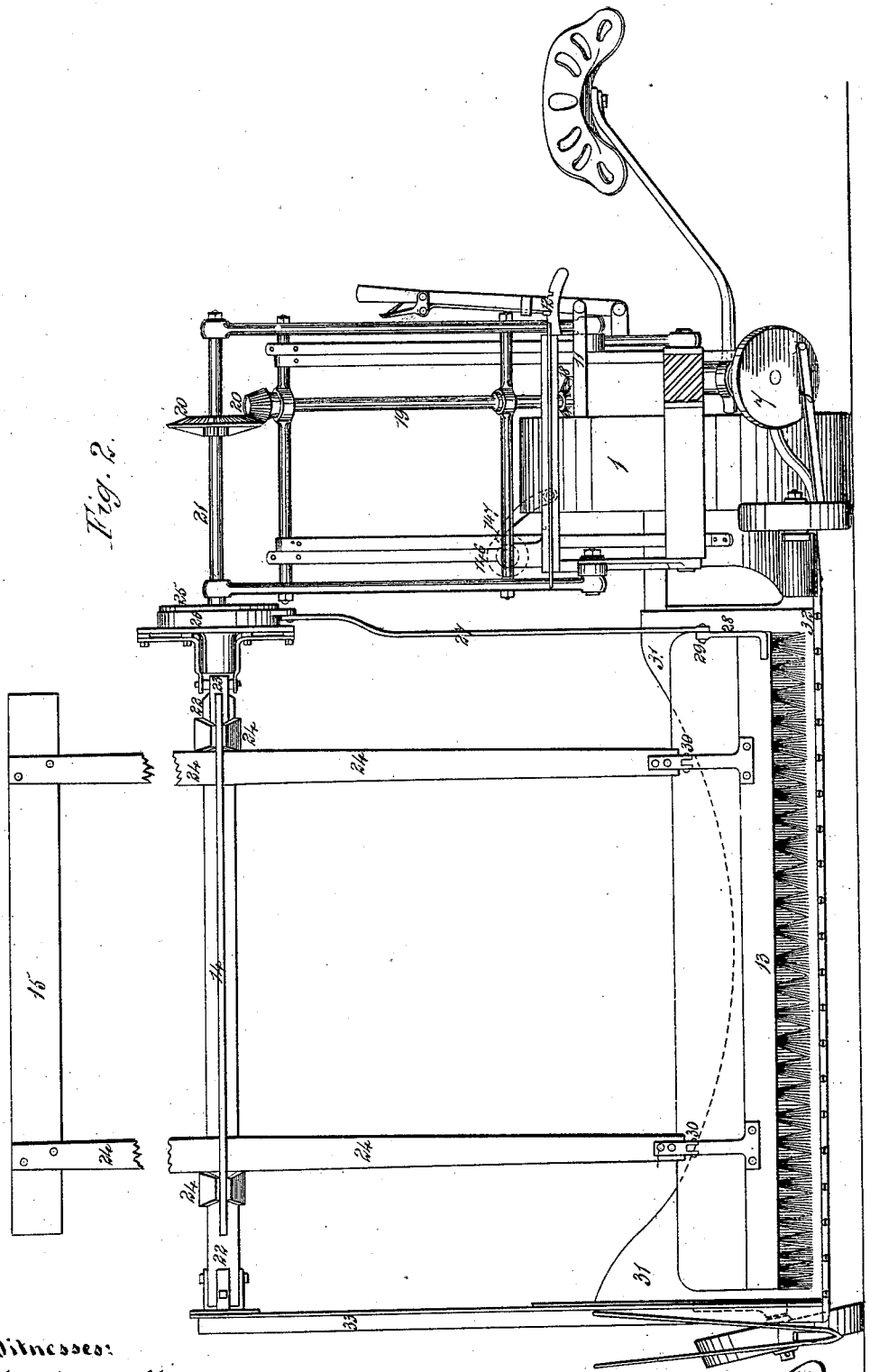
Witnesses:

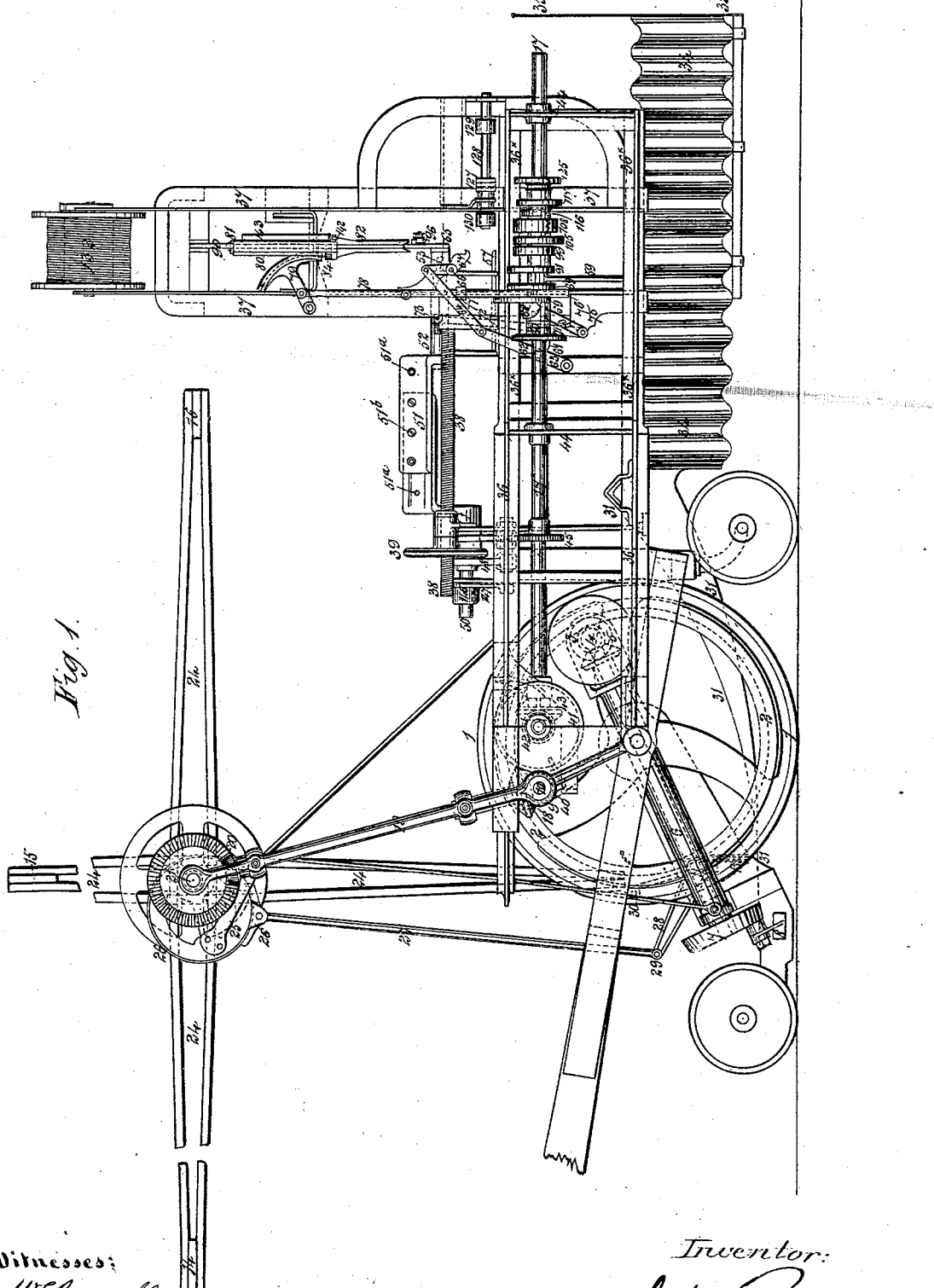

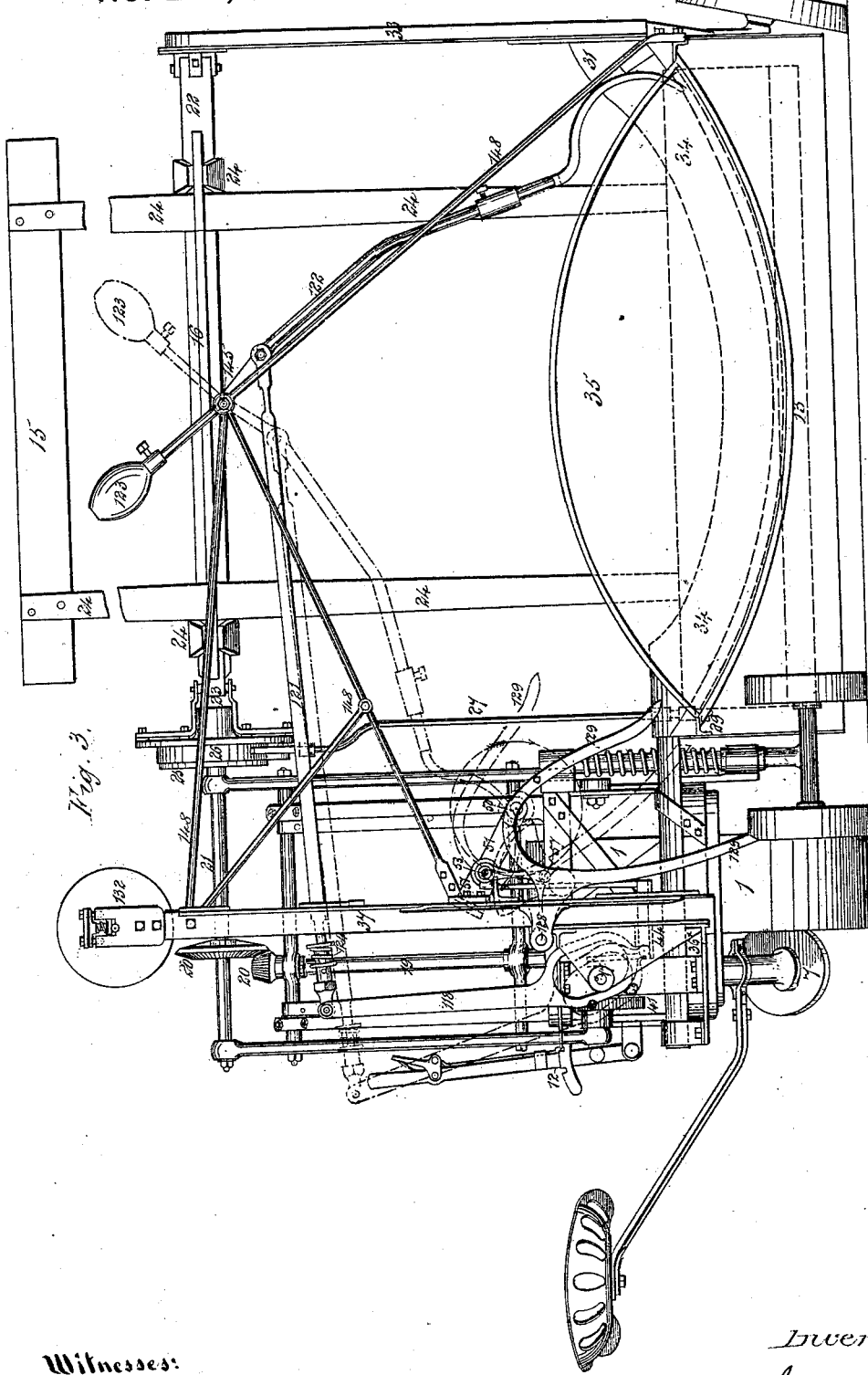

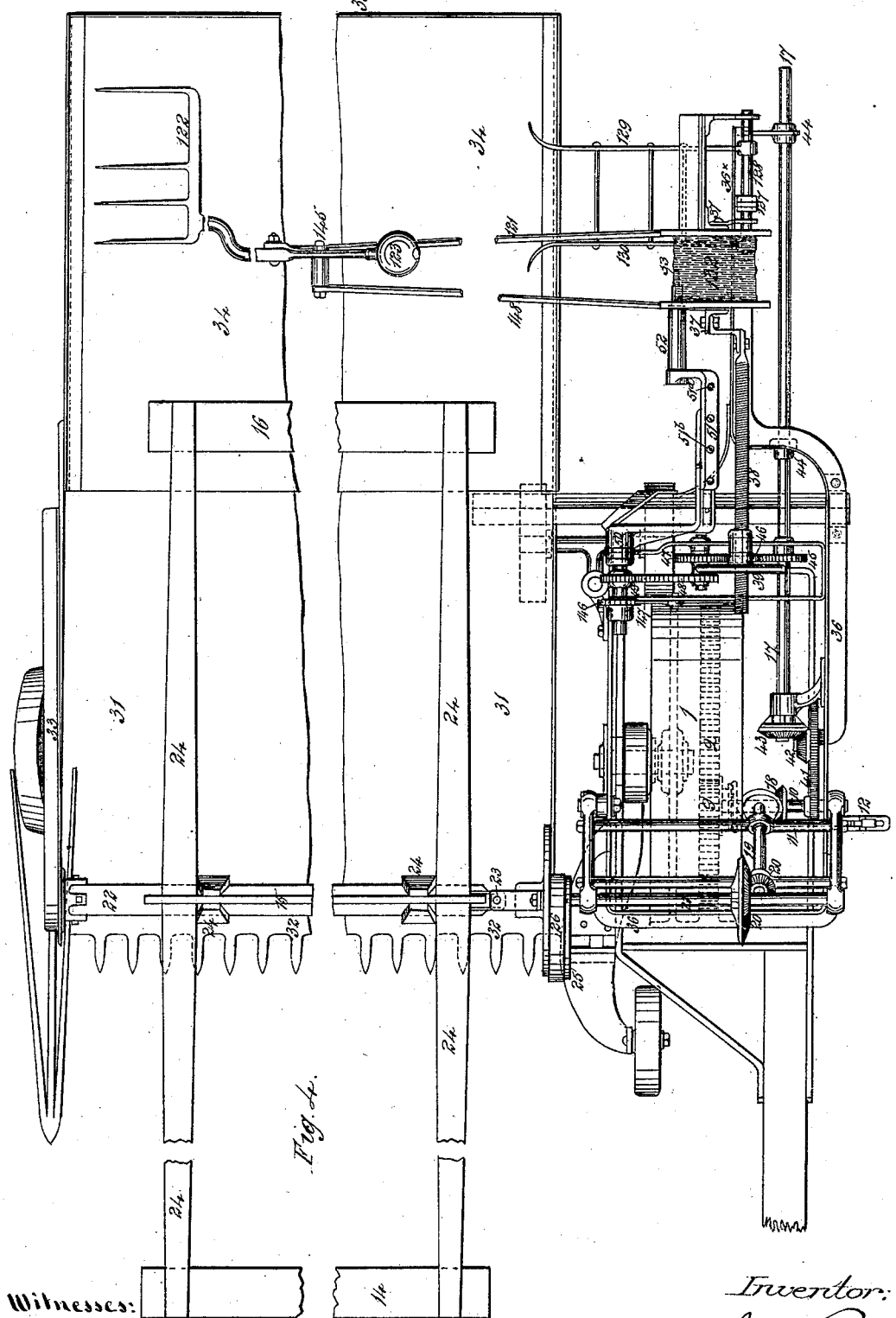

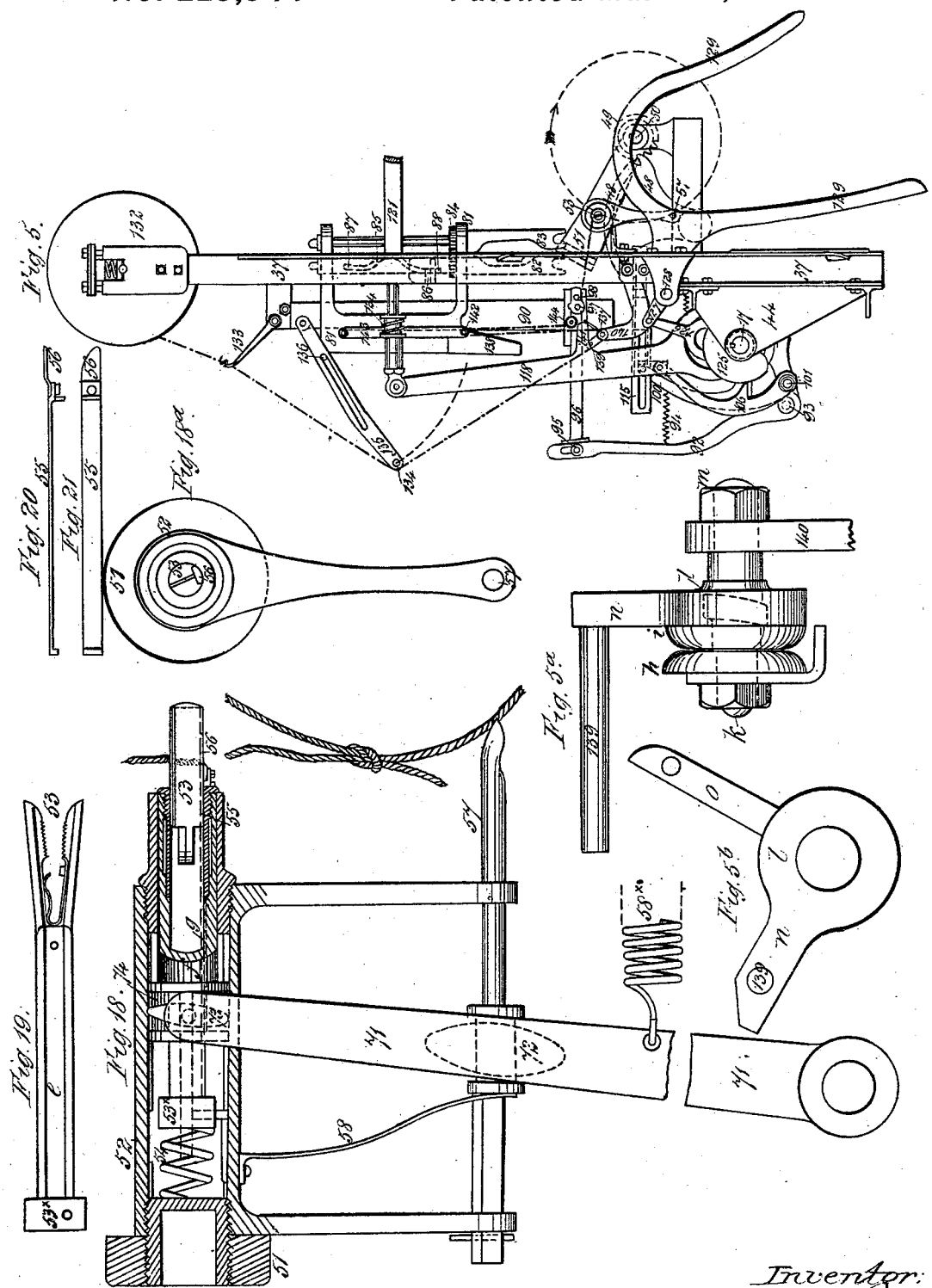

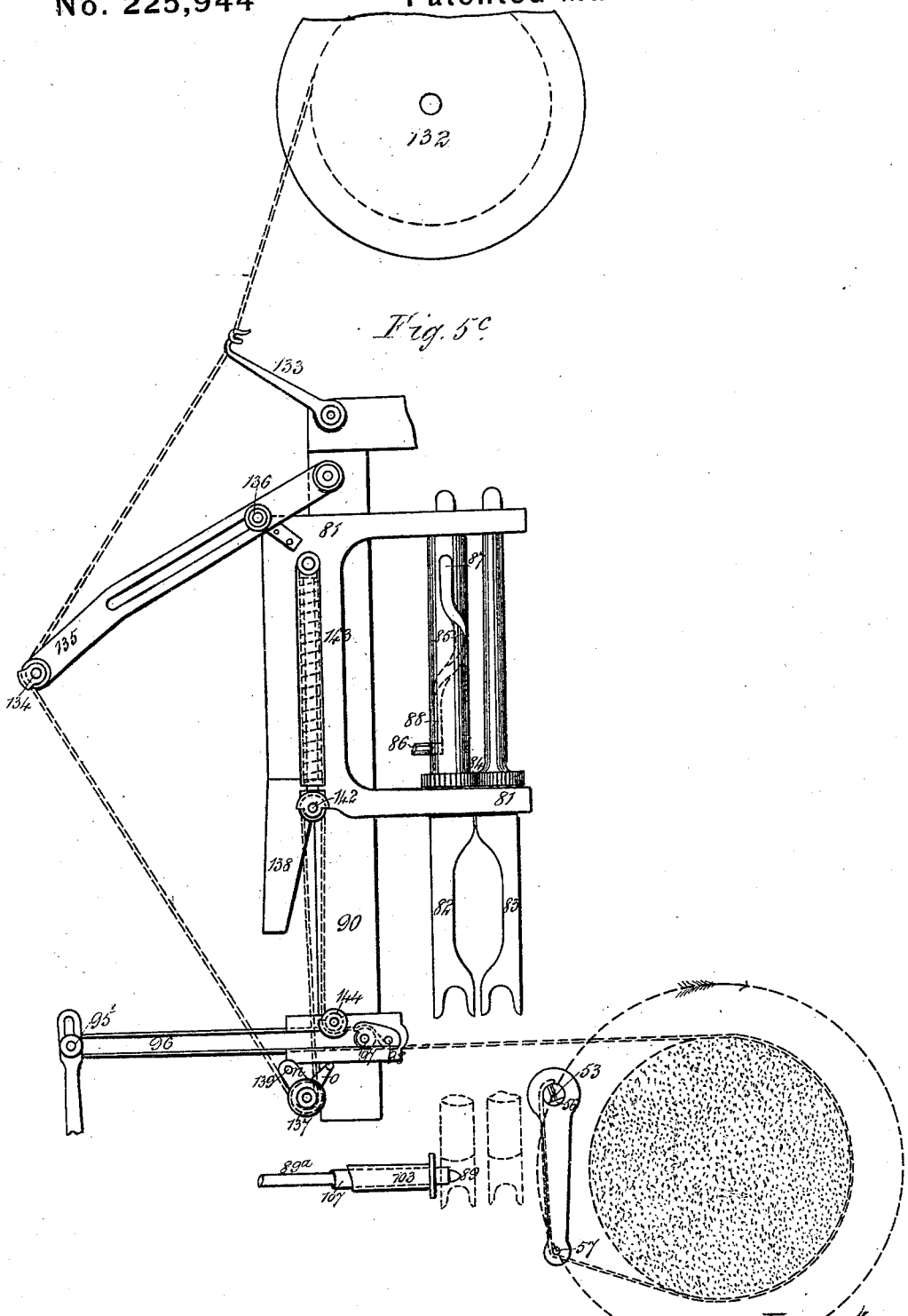

9 Sheets—Sheet 7.
M. T. NEALE.
Grain-Binder.
No. 225,944. Patented Mar. 30, 1880.
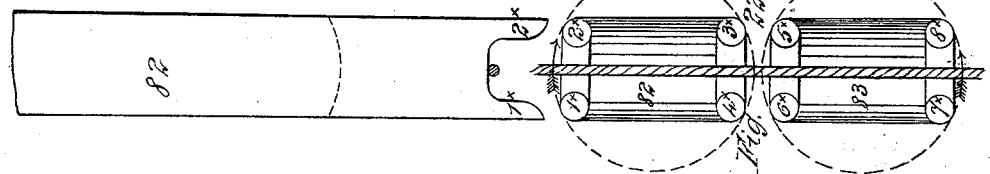
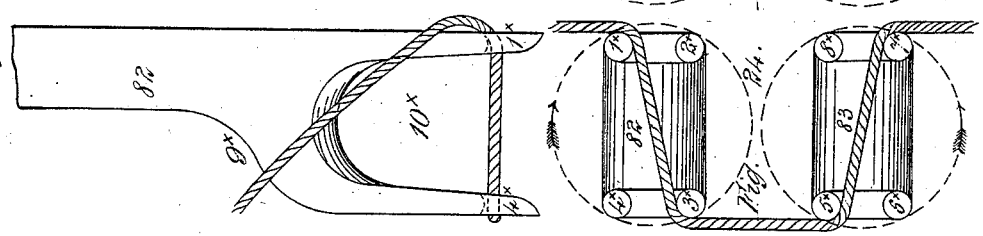
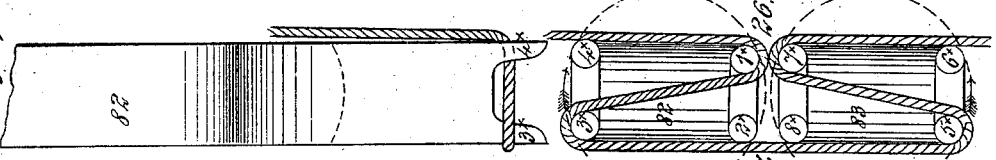
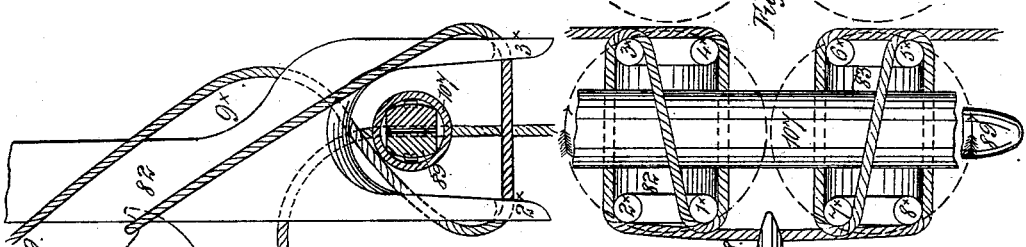
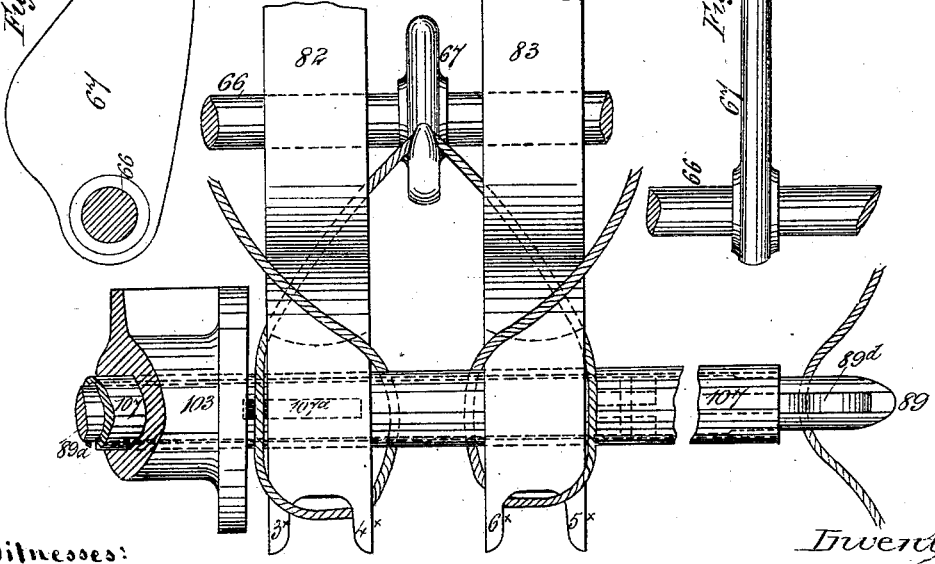

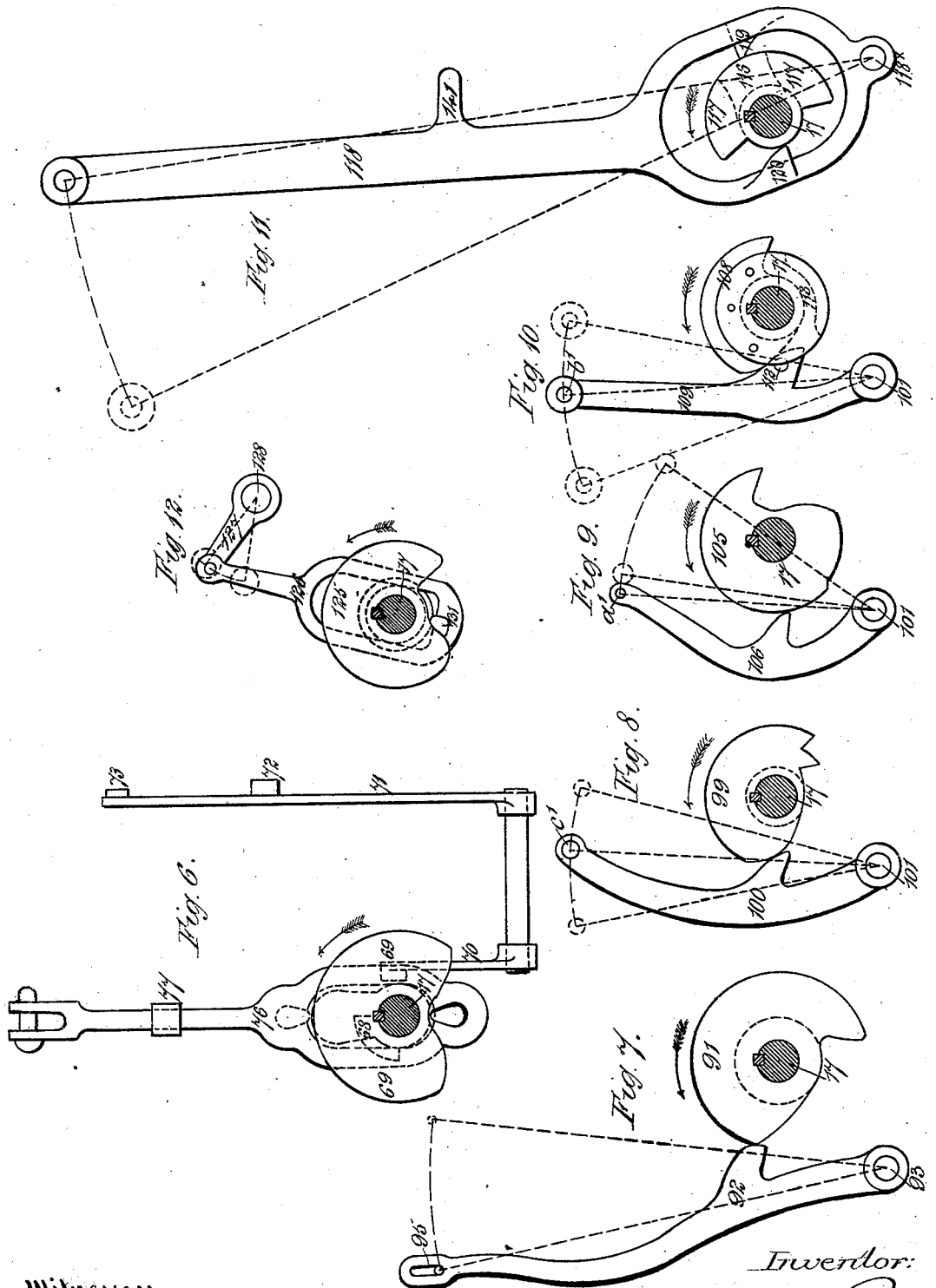

9 Sheets—Sheet 9.
M. T. NEALE.
Grain-Binder.
No. 225,944  Patented Mar. 30, 1880.
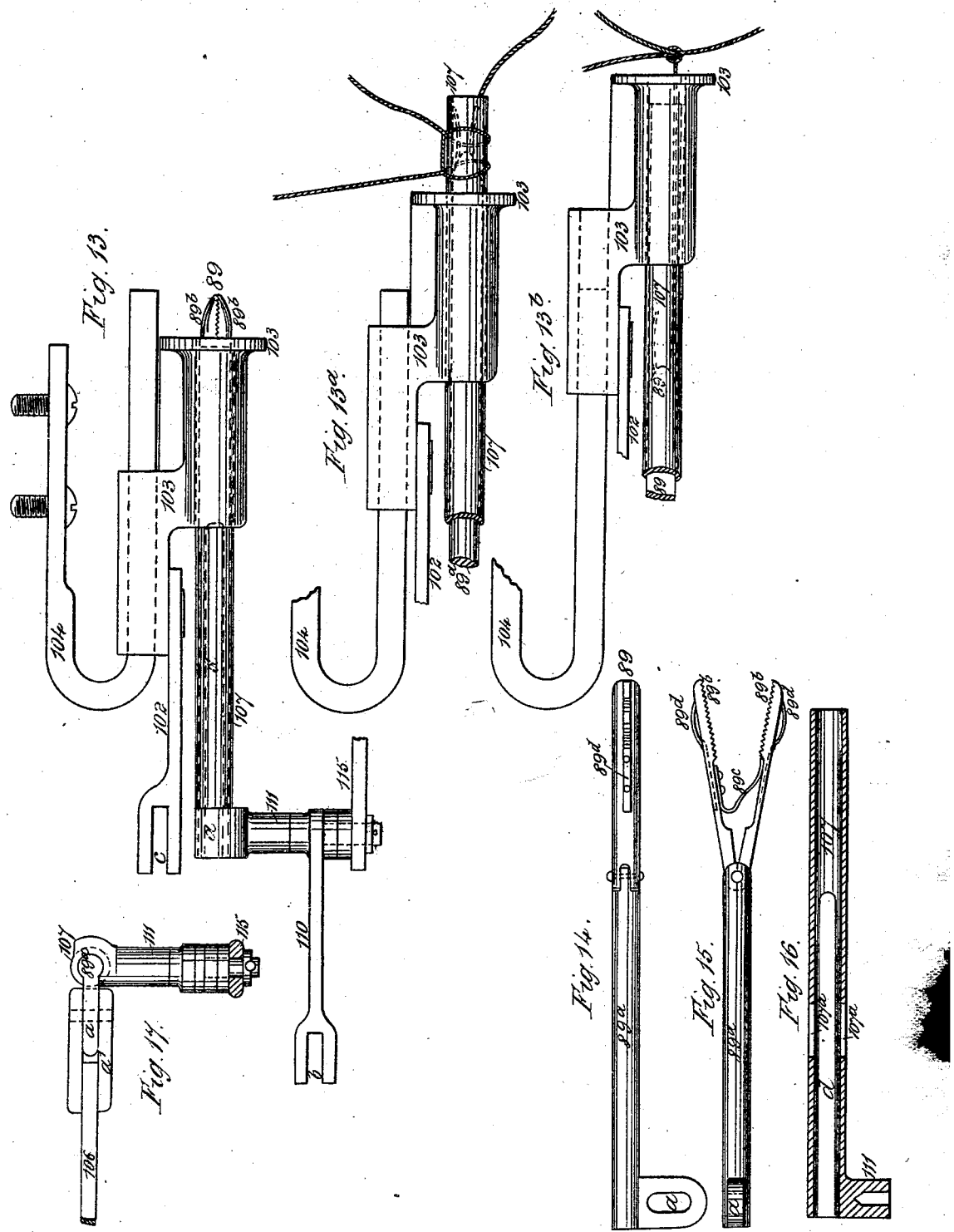

UNITED STATES PATENT OFFICE.

MELVILLE THOMSON NEALE, OF RICHMOND, GREAT BRITAIN.

GRAIN-BINDER.

SPECIFICATION forming part of Letters Patent No. 225,944, dated March 30, 1880.

Application filed September 10, 1877. Patented in England, January 27, 1877.

*To all whom it may concern:*

Be it known that I, MELVILLE THOMSON NEALE, of Richmond, in the county of Surrey, Kingdom of Great Britain and Ireland, have invented certain new and useful Improvements in Harvesting-Machines, wherein the stalks of wheat or other cereals are arranged in bundles or sheaves and tied or bound, which improvements are fully set forth in the annexed specification.

This invention relates to harvesting-machines provided with apparatus for forming the stalks into bundles or sheaves.

In the improved machine the uncut stalks, having been beaten down toward the knives by means of revolving beaters (which may be feathering) and cut, are moved backward onto an appropriately-formed part of the platform into a suitable position, and are then gathered together for tying by means of a reciprocating fork or rake operating in conjunction with guides so arranged as to collect and hold the stalks in a compact form ready for tying. While the stalks are so held the binding material (hereinafter called the "twine") is carried round the collected stalks to bind the sheaf, and by a pair of loopers having rotatory motion two loops are formed simultaneously in a part of the twine intermediate between the reel and the twine-carrier pinchers. When the twine-carrier pinchers which have carried the twine round the stalks have arrived at their normal position (by which I mean their position of rest) a pair of reciprocating pinchers darts through the said loopers and loops to seize that end of the twine which has been carried round as aforesaid; then a tube (which I call the "sheath") closes the pinchers so as to hold the twine fast, and the twine-carrier pinchers release their hold. The loopers are now immediately withdrawn from the twine, leaving the loops on the reciprocating pincher sheath. The reciprocating pinchers retire to a certain distance within the sheath, carrying the end of the twine with them. A pusher then forces the loops off the sheath over that part of the twine whose end is still held by the reciprocating pinchers, and a tension device draws the knot tight. When the twine-carrier takes hold of the twine near the knot and commences its rotatory movement for binding another set of stalks the twine is severed by a suitable knife or cutter. The reciprocating fork having retired and the guides having moved into a suitable position, the reciprocating pinchers now retire a little farther within the sheath, open automatically, and release the end of the twine, allowing the completed sheaf to fall to the ground. The tying apparatus is arranged on an adjustable frame or carriage to provide for the efficient binding of stalks of various lengths.

In the accompanying drawings, the same reference letters and numerals are applied to the same parts of the apparatus when shown in different views.

Figure 1 of the drawings is a side elevation of a portion of a harvesting-machine embodying my improvements.

Fig. 2 is an elevation of the front end of the machine.

Fig. 3 is an elevation of the back end.

Fig. 4 is a plan.

Fig. 5 is a view showing (detached from the machine) portions of the main portion of the mechanism for holding the stalks, passing the twine around them, forming the loops, and tying the knot. The said mechanism is here shown as it is seen by an observer standing at the back of the machine. In this view the cam-shaft, hereinafter described, is in the definite position which agrees with the relative positions of the various cams as they are drawn in Figs. 6, 7, 8, 9, 10, 11, and 12.

Fig. 6 is a view showing, in cross-section, the cam-shaft and, in side elevation, the cam and sling which operate the loopers; also the cam-piece and other parts for actuating the twine-carrier, pinchers, and tail-piece.

Fig. 7 is a view showing, in cross-section, the cam-shaft and, in side elevation, the cam and tappet-lever which operate the spring-tension device.

Fig. 8 is a view showing, in cross-section, the cam-shaft and, in side elevation, the cam and tappet-lever which operate the pusher.

Fig. 9 is a view showing, in cross-section, the cam-shaft and, in side elevation, the cam and tappet-lever which operate the reciprocating pinchers.

Fig. 10 is a view showing, in cross-section, the cam-shaft and, in side elevation, the cam and tappet-lever which operate the sheath of the reciprocating pinchers.

Fig. 11 is a view showing, in cross-section, the cam-shaft and, in side elevation, the cams and tappet-lever which operate the reciprocating fork or rake, whereby the stalks are gathered into the guides and are there held while being bound.

Fig. 12 is a view showing, in cross-section, the cam-shaft and, in side elevation, the cam and cam-sling which operate the guides wherein the stalks are held while being bound.

It will be observed that Figs. 6 to 12, inclusive, are drawn to a larger scale than the preceding figures, and that in all these figures—i. e., Figs. 6 to 12—the cam-shaft is in one and the same position, which position agrees with the position in which that shaft is shown in Fig. 5. Thus Figs. 6 to 12 indicate the relative positions of the several cams on their common shaft.

Fig. 13 is a plan showing the reciprocating pinchers, their sheath, the pusher, and other parts.

In the machine the part $a$, Fig. 13, connects directly onto the part $a'$ of Fig. 9. The part $b$, Fig. 13, connects directly onto the part $b'$ of Fig. 10. The part $c$, Fig. 13, connects directly onto the parts $c'$ of Fig. 8.

Fig. 14 is a side elevation, and Fig. 15 is a plan, of the reciprocating pinchers without their sheath. The part $a$, Figs. 14 and 15, connects directly onto the part $a'$ of Fig. 9.

Fig. 16 is a sectional plan of the sheath of the reciprocating pinchers, showing at $d$ the slot through which the projecting part $a$ of the pinchers passes.

Fig. 17 is an end view of the reciprocating pinchers, their sheath, and other parts forming a guide for the sheath, and this view also shows the connection of the part $a$ of the pinchers with the part $a'$ of the tappet that is shown in Fig. 9.

Fig. 18 is a side elevation, partly in section, of the twine-carrier apparatus, hereinafter referred to as the "twine-carrier."

Fig. 18ª is a view at right angles to Fig. 18— or, in other words, showing the parts as seen from behind the machine.

Fig. 19 is a detached plan view, showing the under side of the twine-carrier pinchers.

Fig. 20 is an edge view of the knife-holder and of the knife which severs the twine after the sheaf has been bound and the twine has been again seized by the twine-carrier pinchers.

Fig. 21 is a side view of the knife-holder and knife. The knife-holder slides in the groove $e$, Fig. 19, and is fixed in the sleeve $f$, Fig. 18, as shown in dotted lines at $g$.

Figs. 22 to 29, inclusive, illustrate the process of forming the two loops simultaneously by means of the two loopers.

Figs. 22, 24, 26, and 28 are bottom views, each showing the lower extremities of the two loopers.

Figs. 23, 25, 27, and 29 are corresponding side views.

It will be observed that in the drawings my invention is shown applied to a reaping-machine of well-known construction. To this reaping-machine, apart from my improvements hereinafter described, I lay no claim, and I would remark that I have shown only so much of this well-known machine as is needful to illustrate the manner of carrying my invention into practical effect. The machine in question is constructed with a main ground or driving wheel, 1, inside of which is a circular rack, 2, Fig. 1, which drives a pinion, 3. This pinion is placed loosely on a shaft, 4, round which is coiled a spiral spring. At the farther end of the pinion 3, and inside one side of it, is a double-toothed clutch-fork, which, when the pinion 3 is permitted to actuate a pin fixed at the end of the shaft 4, turns and works the said shaft in such a manner as to give reciprocatory motion to the reaper-knife, as hereinafter described; but when the machine is backed the pinion 3 does not actuate the said pin, but passes over it in the manner of a ratchet.

At the outer end of the shaft 4 are two bevel-wheels, 5, for driving another shaft, 6, at the end of which is a disk, 7, driving a connecting-rod, 8, which gives the reciprocating action to the reaper-knife. There is also an indirect handle-action on the shaft 4, by means of which the pinion 3 is withdrawn, not quite out of the rack 2, but away from the pin that is fixed at the end of the shaft 4, which action, when used, although it causes the pinion 3 to rotate loosely on the shaft 4, prevents it from actuating that shaft, and thus throws the knife-action out of gear.

According to my invention the rack 2 also drives a pinion, 9, which is placed on a shaft, 10, and is provided with a double-toothed clutch arrangement similar to that of the pinion 3, so that when the pinion 9 is backed or withdrawn it does not actuate the shaft 10; but when the pinion 9 is in gear with the pin on that shaft it does actuate the shaft 10.

The pinion 9 has a circular groove in it, into which fits a clutch-fork, 11, which is attached to a spring stop-lever and quadrant 12, which, when the lever is pulled forward, withdraws the pinion from and prevents its actuating the pin on the shaft 10. When the lever 12 is pushed home the pinion 9 is moved into gear with the pin on the shaft 10. By means of this lever arrangement the whole of the working parts of the machine, with the exception of the reaper-knife, can be thrown in or out of gear.

The shaft 10 performs two functions—that is to say, it drives the rake or brush 13 and the beaters 14 15 16, hereinafter described, and it also drives a long shaft, 17, herein called the "cam-shaft," which shaft actuates the whole of the sheaf-binding apparatus. For the first of these purposes a pair of bevel-wheels, 18, is provided, which drives another shaft, 19, which shaft, by means of another pair of bevel-wheels, 20, at its top, drives a horizontal shaft, 21. At the inner or platform end of the shaft 21 is carried a square shaft, 22, to which are attached the rake and beaters 13 14 15 16. The shaft 21 is connected with the shaft 22 by the universal joint 23, and drives the beater and rake arms 24. The beaters are composed of narrow flat boards or of rods, and are for the purpose of bearing down the heads of the corn toward the knife, in the usual manner. The rake 13 is jointed at 30 to one of the four pairs of arms 24, and may be constructed of tines of wood or tines of bass, (as a brush,) or of other material, as will be readily understood.

At the extremity of the shaft 21, but independent thereof, is an eccentric, 25. To the strap 26 of this eccentric is attached one end of a rod, 27, whose other end is jointed at 29 to an arm, 28, fixed to the brush 13. By these means the brush 13 is caused to retain a nearly vertical position while passing over the first part, 31, of the platform on which the wheat or stalks first fall after being cut by the reaper-knife. This part 31 of the platform is attached to the knife-bar 32, in which the reaper-knife moves.

One end of the square shaft 22 is shown supported by a standard, 33, having in it a hole in which revolves the axis of the square shaft; but the shaft or axis of the brush and beater-arms may be supported entirely from that side of the machine at which the tying and binding apparatus is situated, thus dispensing with the standard 33.

The platform is formed in two parts connected together. The first part, 31, is curved longitudinally to suit the curve described by the brush 13, and is also curved transversely for the purpose of gradually bringing the stalks together in a compact mass as they approach the center of the compound platform. The second part, 34, of the platform is somewhat lower than the first part, 31, and forms an arc of a circle at right angles to that described by the beater and rake arms 24. The part 34 is grooved or corrugated for the purpose hereinafter described.

At the rear end of the part 34 of the platform is a movable screen, 35, which is capable of being moved in or out, as may be required, according to the length of stalk to be bound, and is for the purpose of preventing the stalks from being shot over too far by the brush 13.

The binding and tying apparatus, with its frame-work, is supported by a horizontal frame or bed, 36. The portion 36* of this bed 36 is planed on its face and edges to receive the upright frame-work 37, which carries the binding and tying apparatus. The upright part 37 is adjustable along the bed 36, as required, for the purpose of tying different lengths of stalks, and to this end is actuated by a hand-wheel nut, 39, carried on the horizontal frame or bed 36, and free to rotate so as to move endwise the screw 38, one end of which is fastened to the frame 37.

The shaft 10, by means of a pinion, 40, operates a spur-wheel, 41, which revolves on a stud fixed to the horizontal frame 36. With the wheel 41 is cast a bevel-pinion, 42, which gears into the bevel-wheel 43, and thereby drives the shaft 17. This shaft is supported by bearings 44 carried by the frame 36.

On the shaft 17 is fixed a cog-wheel, 45, which actuates two intermediate cog-wheels, 46 47. The boss of the cog-wheel 47 carries a quadrant, 48, revolving on the same axis as the wheel 47, which quadrant, at certain intervals, gears into and works a pinion, 49, attached to the shaft 50, on which shaft is fixed the arm 51 of the twine-carrier, which is thus caused to make one complete revolution each time the quadrant passes the pinion 49, the number of teeth on the quadrant being the same as the number on the pinion.

The arm 51 is made in two parts, screwed together. The screw-holes $51^a$ are alike and equidistant, and the screws $51^b$ are interchangeable, so as to permit of the twine-carrier pinchers being moved to and fixed in their proper position to agree with the adjustment of the frame 37 by the screw 38 and wheel 39.

The arm 51 carries at its extreme end a tube, 52, inside which are the twine-carrier pinchers 53 and their sleeve $f$. The pinchers 53 are kept out in their normal position, Fig. 18, by a spiral spring, 54, arranged inside the tube 52, as shown in Fig. 18.

Over the pinchers 53 and inside the tube 52 passes the sleeve $f$, carrying the knife-holder 55 and its small knife 56, which slide backward and forward in a recess, $e$, cut into and along the under side of the stem of the pinchers 53 and along their jaws.

Affixed to the outer tube, 52, are two supports, which carry a rod or "tail-piece," 57, which slides in those supports, and is kept in its outward position by a spring, 58.

Attached to the upright sliding frame 37 is a bracket, 59, which is so placed in regard to the cams that as the frame 37 is moved the cams slide along the shaft 17 and retain their proper relative positions.

On the cam-shaft 17 a number of cams (see Figs. 6 to 12, inclusive) are placed. These cams give the various motions required for the binding and tying operations. These cams are kept together and prevented from turning independently of the shaft 17 by a long feather-key, common to the whole of the cams, and secured at its respective ends to the corresponding end cams. The feather-key fits into a groove in the shaft 17. Hence the cams are capable of being moved together along the shaft 17 (retaining their relative positions to one another and to the frame 37) when the upright frame is moved, for the purpose of adapting the apparatus to any special length of stalk to be tied.

60 61 is the loop-lifter device. The projecting part 61, once during each revolution of the shaft 17, strikes a projection, 62, of a lever, 63, thereby moving that lever to one side, and so actuating a connecting-rod, 64, which is jointed to the end of a small lever, 65, fixed on a spindle, 66, which moves the loop-lifter 67.

A spiral spring attached to the lever 63 and to the pusher-guide 104 keeps the loop-lifter 67 normally in a downward position, in which it remains until the projection or tappet-piece 61 causes it to rise. When the said projection or tappet-piece has passed, the spring causes the lever 63 and its attachments to return to their normal positions. 68 is a tappet fixed onto the side of a cam, 69, hereinafter described. The tappet 68, once during each revolution of the shaft 17, strikes and moves to one side a lever, 70, thereby causing that lever to proportionately move another lever, 71, which carries two projections or tappets, 72 73. The tappet 73 engages in a niche, 74, in the sleeve $f$, Fig. 18, of the twine-carrier pinchers 53. The tappet 72 engages in a similar niche in the tail-piece 57, so that when the tappet 68 is moving the levers 70 71 the tappets 72 73 on the lever 71 are causing the twine-carrier pinchers 53 and the tail-piece 57 to move backward or withdraw both in the same direction, and when the tappet 68 releases the levers 70 71 a spring, $58^\times$, causes the said levers 70 71, the twine-carrier pinchers 53, the sleeve $f$, and the tail-piece 57 to smartly return.

It should here be observed that the formation of the twine-carrier pincher-tube 52 is such as to permit of the following three actions during one stroke—that is to say, one backward movement of the levers 70 71 causes the sleeve $f$ to withdraw and open the pinchers 53 and simultaneously to draw back the knife-holder 55 and knife 56, and also, by the pressure of the back of the sleeve $f$ on the end of the pincher-bar $53^\times$, to carry bodily back the pinchers themselves, thus getting them out of the way at the moment required.

The levers 70 71 are centered in the upright or movable frame 37.

The arm 51 carries the tail-piece, pinchers, sleeve, and other parts away from the lever 71 and round the collected stalks at the proper time, meanwhile leaving the said lever in its normal position.

The cam 69 on the shaft 17 is a double cam, (see Fig. 1,) and is formed as shown in Fig. 6, so that during each revolution of the shaft 17 the said cam gives one upward and one downward motion to a sling, 76, reciprocating in a vertical plane, and kept in such plane by a suitable guide, 77. The sling 76 is connected by a rod, 78, to a toothed quadrant, 79, which gears into a rack, 80, on the side of a frame, 81. This frame 81 carries the two loopers 82 83, which are geared together by means of a pair of cog-wheels, 84. These cog-wheels are alike. Thus the upward and downward movement of the sling 76 causes the loopers 82 83 and their frame 81 to also make an upward and a downward movement.

The looper 82 is formed with a slot, 85, passing three-quarters round the looper. (See Fig. 5.) In this slot works a pin, 86, fixed to the frame 37, and thus as the loopers descend together the looper 82 is rotated to the left, and being geared, as described, with the other looper 83, the latter is simultaneously rotated to the right. The two loopers having been thus caused to simultaneously make three-quarters of a complete rotation, the pin 86 enters one or other of the straight parts 87 88 of the slot in the looper 82. By this arrangement the loopers 82 83 are caused, during their downward movement, to fall fairly across the twine, as shown in Figs. 22 and 23, before commencing their rotations. As they rotate they successively assume the respective positions shown in Figs. 24 and 25, in Figs. 26 and 27, and in Figs. 28 and 29. Having arrived at the relative positions shown in Figs. 28 and 29, the two loopers now descend, with the loops on them, until they arrive directly opposite to the reciprocating pinchers 89, Fig. $5^c$. The loop-lifter 67 then seizes the twine, as shown in Figs. 28 and 29, and raises it to enable the reciprocating pinchers to pass freely between the two loops of twine, as hereinafter described.

Fig. $5^d$ shows to an enlarged scale the lower portions of the loopers with the two loops formed thereon, the loop-lifter, the fore ends of the reciprocating pinchers, their sheath, and the pusher in the positions they respectively occupy immediately before the loopers commence to rise and leave the loops on the pincher-sheath.

The whole of the movable framing 81, which carries the loopers 82 83, moves up and down on a guide-bar, 90, placed in a vertical position. 91 is a cam which, once during each rotation of the shaft 17, forces outward a lever, 92, (whose fulcrum is at 93,) and keeps the said lever in such outward position during the greater part of the revolution of the cam-shaft 17. The object of thus retaining the lever 92 outward is to keep the spring-tension, hereinafter described, clear of the loopers while the latter are descending. 94 is a spring whereby the lever 92 is drawn toward its normal or inward position.

When released by the cam 91 the lever 92 returns rapidly toward the frame 37. To the spring-lever 92 is connected, by means of a slot-joint, 95, a slide, 96, sliding in suitable guides fixed on the guide-bar 90. At the end of the slide 96 are carried a pulley, 97, and a roller, 98, between which the twine passes on its way to the twine-carrier pinchers 53. 99 is a cam, also arranged on and actuated by the shaft 17. This cam gives to a lever, 100, a motion for the most part very similar to that given by the cam 91 to the lever 92. The lever 100, whose fulcrum is at 101, is at $c'$ connected, as already described, to a rod, 102. (See Fig. 13.) This rod is jointed to the sliding pusher 103, which slides on the guide-bar 104 fixed to the upright framing 37. The lever 100 is connected by a spring to the frame 37 in the same way as the lever 92 is connected to that frame by the spring 94.

The cam 99 allows the spring of lever 100 to impart two inward motions of different degrees to the said lever 100, and during more than half the revolution of the cam-shaft 17 the said cam keeps the said lever and the pusher 103 in their outward positions.

105 is another cam on the shaft 17. This cam (clearly shown in Fig. 9) actuates a lever, 106, on the same fulcrum as the lever 100. To the part $a'$ of the lever 106 is attached, as already explained, the part $a$ of the reciprocating pinchers 89. The lever 106 is connected to the frame 37 by a spring in the same way as are the levers 92 and 100. The spring (not shown) constantly draws the lever 106 toward the frame 37. The cam 105 allows the lever 106, during each revolution of the shaft 17, to move rapidly inward once and forces it outward to nearly its extreme position, retaining it there during about one-seventh of the shaft's revolution; then the cam forces the lever out to its fullest extent, in which position it remains during more than one-half the revolution of the shaft 17.

During this last-mentioned period the reciprocating pinchers 89 are confined within their sheath 107. 108 is another cam on the same shaft 17, and actuates a lever, 109, connected, like the lever 92, by a spring to the frame 37. To the part $b'$ of this lever is jointed the part $b$ of the link 110, Fig. 13. The link 110 is connected to a stud-piece, 111, which is attached to the pincher-sheath 107. The cam 108 allows the lever 109, once during each revolution of the shaft 17, to fly to its innermost position, where it remains during rather more than one-fourth the revolution of the said shaft. Then the lever is forced to its most outward position, where it remains during rather less than one-half the revolution of the shaft 17. It is necessary that the lever 109, after having assumed its innermost position, should be retained there until it is forced out by the cam 108. For this purpose a pin, 112, is placed on the side of the tappet of the lever, as shown in Fig. 10, which pin takes into a groove, 113, in the face of the cam 108.

I will now describe the construction of the pinchers 89, their sheath 107, and the pusher 103, which are actuated, respectively, by the cams 105, 108, and 99, as already explained. The pinchers 89 consist of a cylindrical stem-piece, $89^a$, at one end of which is formed a lug, $a$, for the purpose hereinbefore referred to. To the other end of the stem-piece are jointed the jaws $89^b$ in such a manner that by their spring $89^c$ they can be moved apart to the extent shown in Fig. 15. The outer side of each jaw is recessed and fitted with a spring, $89^d$, as shown. These springs operate in connection with the sheath 107, as hereinafter described. The sheath 107 is a thin steel tube formed with a stud-piece, 111, as described, and with a slot, $d$, in its under side, in which slot the lug $a$ of the pinchers travels. Each side of the sheath is slotted at $107^a$ to receive the springs $89^d$ of the pinchers 89, so as to allow the pinchers to open and thus release the twine when the pinchers are drawn back to their fullest extent. The sheath works in the pusher 103, which acts as a guide, and the extremity of the stud-piece 111 works in a slotted guide, 115, connected to the frame 37. The pusher 103 works on the guide-bar 104, as already explained.

116 and 117 are two cams, carrying between them a duplex lever, 118, with tappets 119 and 120. (Shown more particularly in Fig. 11.) These cams are on the shaft 17. The lever 118 (whose fulcrum is at $118^x$) is connected by a compound connecting-rod, 121, to the reciprocating fork or cross-rake 122, and moves it once backward and once forward along the grooves or corrugations of the second part, 34, of the platform during each revolution of the shaft 17. The period of rest of the fork in its inward position is rather longer than the time occupied by the shaft 17 in making half a revolution, thus giving time for the binding of the sheaf. The fork 122 is surmounted by a counterbalancing-weight, 123.

On the connecting-rod 121 is a short spiral spring, 124, which allows the said rod to lengthen telescopically—that is to say, that when any undue strain comes upon the rod, owing to resistance offered to the rake by a large-sized sheaf, the spring will be compressed and will allow the cams to complete their revolution.

125 is another cam, also placed on the shaft 17. This cam gives a to-and-fro or backward-and-forward motion to a sling, 126, which passes round the boss of the cam, and at one end is jointed to a lever, 127. This lever is firmly fixed to a small shaft, 128, to which are attached the curved guides 129 130. These guides rise and fall once during each revolution of the shaft 17—that is to say, the weight of the guides keeps the tappet 131 always against the edge of the cam 125, so that, owing to the form of the cam, the guides remain in their lowest position during about one-sixth of the revolution of the shaft 17, at which time they drop the sheaf, and during fully two-thirds of the revolution of the shaft they are kept in their highest position, to admit of the stalks being forced into them by the fork 122 and held there while being bound.

The reel of twine or string 132 is carried on the top of the upright framing 37, and one or both of its axes are provided with a spring-bearing to exert the necessary amount of friction to prevent the reel unwinding the twine too freely. The spring-bearings may be made adjustable. The twine is led down from the reel through a guide, 133, to a pulley, 134, at the end of a slotted arm, 135, which arm is jointed to a fixed center on the guide-bar 90 of the frame 81. A pin, 136, on the looper-frame 81, takes into the slot of the arm 135, and causes the said arm to vibrate as the looper-frame moves. The object of the arm 135 is to slacken the twine while the loops are being formed. From the pulley 134 the twine pursues the course illustrated more clearly in Fig. 5°—that is to say, it is led down to a holding device, 137. This holding device is shown in Figs. 5ª and 5ᵇ. It is composed of two flat disks, h and i, formed with rounded edges. The disk h is fixed onto an axis, k. The disk i is loose on the said axis, and is pressed toward the disk h by a nut, l, having two projections, n o, at right angles to each other. This nut has a quick-thread fitted to a screw on the axis k. The axis k is fixed by a nut, m, to a bracket, 140, attached to the frame 37. The twine runs freely between the disks h i until the frame 81 has reached the bottom of its stroke, whereupon a striker, 138, attached to the said frame, strikes the pin 139 of the projection n of the nut l, and by turning it on the screwed axis k causes the disk i to press the twine against the disk h, thus holding the twine between the two disks. When the twine is to be released by the holding device a striker, 141, affixed to the rake-lever 118, strikes another pin on the arm o and returns the nut l, allowing the disk i to resume its previous position.

From the holding device the twine passes over a pulley, 142. This pulley, in order to be capable of descending independently of the frame 81, is carried by the lower end of a rod working in a tube, 143, attached to the looper-frame 81. This rod is enlarged at its upper end, and below the enlargement is surrounded by a long spiral spring in compression. This spring keeps the rod normally within the tube. The object of this arrangement is to prevent the breaking of the twine through any undue strain.

From the pulley 142 the twine passes down to and under a pulley, 144, (fixed on the guide-bar 90,) thence over the pulley 97 and under the roller 98 to the twine-carrier pinchers 53. 145 is the axis of the rake 122. This axis is supported and stayed by tie-rods 148, as shown. 146 is a ratchet-plate, and 147 a pawl arranged at the front end of the twine-carrier shaft, to enable the twine-carrier arm to rest definitely in its normal position after the quadrant 48 has left the pinion 49.

Operation of the machine: The stalks, on being cut by the reaper-knife, fall on the part 31 of the platform and are swept at regular intervals by the rake or brush 13 onto the second part, 34, of the platform, where they fall compactly across the grooves or corrugations, the object of which is to keep the stalks well above the lower extremities of the fork-teeth, so that the said teeth, in their collecting operation, shall not miss any of the stalks. The reciprocating fork or cross-rake 122 sweeps the stalks up into the guides 129 130, which have previously risen to the position shown dotted in Fig. 3, to receive the stalks, and wherein they are compressed into the form of a sheaf. The twine-carrier arm 51 then immediately revolves in the direction of the arrow, Fig. 3, around the collected stalks, carrying the twine between its pinchers 53. As the arm 51 goes round the stalks the twine (intermediate between the reel 132 and the pinchers 53) falls over the end of the tail-piece 57, and just before the twine-carrier pinchers finish their circular course the loopers 82 83 descend together and pass over that part of the twine in which the loops have to be formed, as shown in Figs. 22 and 23. Immediately afterward, and when the twine-carrier pinchers have stopped, the loopers, while still descending, revolve sufficiently to form the two loops, as described with reference to Figs. 24 to 29, inclusive. As the loopers descend, and while the loops are being formed, the loop-lifter 67 rises and lifts a portion of the twine between the loopers, as shown in Figs. 28 and 29, until, on the loopers arriving at the bottom of their stroke, (with the loops still on them,) the reciprocating pinchers 89 dart forward and pass between the prongs of the loopers and through the loops. (See Figs. 5ᵈ, 28, and 29.) Then these pinchers open automatically, and their jaws pass, respectively, over opposite sides of the twine which has been carried round by the twine-carrier pinchers 53, and which part of the twine, by being carried over the point of the tail-piece 57, has now assumed a nearly vertical position, so as to be easily seized by the reciprocating pinchers 89 when they close. They are shown closed in Figs. 5ᵈ, 28, and 29. Immediately after the reciprocating pinchers 89 have darted forward, as described, their sheath 107 moves over them and causes them to close, and in closing the pinchers gripe the aforesaid presented end of the twine. At this moment the twine-carrier pinchers 53 let go their hold and recede, carrying with them the tail-piece 57, which thus gets out of the way of the twine. Simultaneously the loopers 82 83 rise and leave their loops on the sheath 107, and the reciprocating pinches 89 recede into the sheath, carrying the end of the twine with them. The pusher 103 now darts forward a short distance over the sheath 107, pushing the loops with it. The position at this moment of the loops, the pinchers, their sheath, and the pusher is shown in Fig. 13ª. During the last-mentioned operation of the pusher the reciprocating pinchers 89 are still receding, and are so drawing the twine tightly around the stalks. When a certain amount of tension has been attained the pusher 103, by a further movement, pushes the loops off the sheath 107 onto the twine, whose end is still held by the reciprocating pinchers 89, and the spring-tension device, acting almost simultaneously with the pusher 103 at the same instant as the loops are pushed off the sheath, exerts a tightening action which draws the loops into a tight knot. Fig. 13ᵇ shows the positions of the reciprocating pinchers and other parts at this moment. As the spring-tension device comes forward to a point immediately above the pusher 103, the portion of twine extending from the knot (now at or near the extremity of the pusher) to the spring-tension device is in a direct vertical line, or nearly so, and is opposite the jaws of the twine-carrier pinchers 53. At this moment the said pinchers and their knife 56 move smartly forward immediately below the spring-tension roller 98. Thus the twine is simultaneously severed by the knife and seized by the pinchers. The rake 122 now recedes, and the guides 129 130 drop. The reciprocating pinchers are now moved back in their sheath until the springs 89$^d$ enter the slots 107$^a$, whereupon the pinchers open and release the end of the twine, and the tied sheaf falls to the ground at the side, out of the course of the next traverse of the machine.

It is to be remarked that the gearing is so proportioned as that during each forward rotation of the cam-shaft 17 the shaft 21 makes one complete rotation, the wheel 47 and the quadrant 48 make one rotation, and the twine-carrier shaft makes one complete rotation, the movement of the latter being intermittent.

I would remark that the drawings show the machine as I have constructed it; but it will be evident that modifications in detail may be made—as, for instance, that two or more of the cams may be cast or made in one piece; that face-cams may be substituted for some of the spring-levers and edge-cams for giving some of the motions; and that some of the parts, such as brackets, shown as being made separate and fixed to the frames, may be formed in one therewith; also, that in lieu of the reel 132, with spring bearing or bearings, a box containing a ball of twine may be substituted.

I claim as my invention—

1. The combination, with the forward transversely-curved part, 31, of the platform and apparatus for moving the stalks over it, of the rearward part, 34, of the platform, curved to correspond with the transverse curvature of the part 31, and the vibrating fork moving in an arc corresponding with said curvature, substantially as described.

2. The combination, with the curved rearward part, 34, of the platform, of the reciprocating fork 122, curved at the outer end, and guides 129 130, having curved forked arms and operating mechanism, as described, adapted to reciprocate said fork and to move said guides into position to receive, and in connection with the curved portion of said fork to hold, the cut stalks while they are bound, and also to move said guides into position to deliver the bound sheaf, substantially as set forth.

3. The combination, in a harvesting-machine, of mechanism for carrying binding material from a reel or ball about the sheaf or gavel, mechanism for forming loops in the binding material at a point between the reel or ball and the sheaf, and means for passing the free end of the binding material through said loops, substantially as described.

4. The combination, with a carrier whereby binding material is carried round a collection of stalks, of loopers arranged to form two loops in the said binding material, and reciprocating pinchers, whereby the end of the binding material that has been carried round the collected stalks is passed through the said loops, as described.

5. The combination, with the loopers, adapted to form loops in the binding material between the point from which it is delivered and the sheaf or gavel, and reciprocating pinchers, of a pusher, whereby the loops that have been formed by the loopers are caused to pass onto the binding material to form the knot while the end of the binding material is held by the reciprocating pinchers, as described.

6. The combination, with a shaft, 50, and an arm furnished with means for carrying binding material round a collection of stalks, of a pinion, 49, fixed on said shaft, a quadrant, 48, operated as described and geared with said pinion 49, for causing the apparatus whereby the end of the binding material is held to pass at the proper intervals around the collected stalks, and a ratchet, 146, and pawl 147, for preventing the return movement of the arm, as above described and shown, for the purpose set forth.

7. In combination with the compound or adjustable arm 51 and means for intermittently rotating it, the tube 52, twine-carrier pinchers 53, their sleeve $f$, and spring 54, as described, for the purpose specified.

8. In combination with the pinchers 53, their sleeve $f$, and the tube 52, the knife-holder 55 and knife 56, arranged to slide backward and forward in the recess $e$ in the under side of the stem and jaws of the pinchers, as described, for the purpose specified.

9. In combination with the tube 52, the twine-carrier pinchers 53 and other parts, as described, the rod or tail-piece 57, arranged to slide in supports or guides, and the spring 58, whereby said rod or tail-piece is kept in its outward position, as described, for the purpose specified.

10. In combination with the sleeve $f$ of the pinchers 53, the sliding rod or tail-piece 57, and means for keeping said rod or tail-piece in its outward position, the lever 71, with its projections or tappets 72 73, and means for operating said lever, as described, for the purposes specified.

11. The combination of two loopers and means for rotating the same in opposite directions, as described, so as to form two loops in the twine or binding material simultaneously, as above set forth, for the purpose specified.

12. The looper 82, with its slot formed with straight parts 87 and 88, and a curved part, 85, passing three-quarters round it, and the looper 83, connected by gearing with the looper 82, in combination with the fixed pin or projection 86, whereby the loopers are partially rotated simultaneously as they descend, as described, for the purpose specified.

13. The looper, formed at its lower part with a shoulder, $9^\times$, and opening $10^\times$, for the passage of the pinchers 89 and sheath 107, and terminating in four prongs or projections, as shown in Figs. 23, 25, 27, and 29, for the purpose specified.

14. The combination, with the loopers for simultaneously forming two loops, of the loop-lifter 67 on the shaft 66 and means for operating the same, as described, so that it shall raise the twine or binding material, to enable the reciprocating pinchers to pass freely between the two loops, as described.

15. The combination, with the loopers 82 83, shaft 66, and loop-lifter 67, of the reciprocating pinchers 89, their sheath 107, and the pusher 103, all arranged and operating as described, for the purposes specified.

16. The combination, with the cylindrical stem-piece $89^a$, with its lug $a$, the jaws $89^b$, means for forcing same apart, and the springs $89^d$ on the outer sides of said jaws, of the sheath 107, with its stud-piece 111, slot $d$, and slots $107^a$, all substantially as shown and described, for the purpose specified.

17. The combination, with apparatus for simultaneously forming two loops in twine or binding material and apparatus whereby one end of said binding material is passed through said loops, of a tension device, whereby the formation of the knot is completed and the end of the twine or binding material is presented to the twine-carrier pinchers, as above described, for the purpose specified.

18. The combination of the guide 133, slotted arm 135, with its pulley 134, and holding device 137, as described, for the purpose specified.

19. In combination with the striker 138 of the looper-frame and the striker 141 of the rake-lever, the holding device, constructed with two flat disks, $h$ and $i$, with rounded edges, axis $k$ with quick-thread, and nut $l$ with its projections $n$ $o$ and their respective pins, as described and shown, for the purpose specified.

20. In combination with the guide 133, slotted arm 134, and holding device 137, the pulley 142, its rod, spring, and tube 143, pulley 144, pulley 97, roller 98, and the slide 96, operated, as described, for exerting the necessary tightening action, as explained, for the purpose specified.

21. The combination, with the reciprocating fork 122, duplex lever 118, and means for operating same, as described, of the compound connecting-rod 121, with its spiral spring 124, the whole arranged and operating as described, for the purpose specified.

22. The combination, with the cam 125 on the shaft 17, of the sling 126, lever 127, shaft 128, and guides 129 130, the whole arranged and operating as described, for the purpose specified.

23. The combination, with the loop-lifter lever 63, the twine-carrier pincher-levers 70 71, the looper-operating sling 76, the tension device lever 92, the pusher-lever 99, the pincher-operating lever 105, the pinchers-sheath lever 109, the reciprocating fork-lever 118, and the guide-operating sling 126, of the loop-lifter operating device 60 61, and the cams 69, 91, 99, 105, 108, 116, 117, and 125, keyed together on the grooved shaft 17, and arranged to be moved together along said shaft by the bracket 59 of the movable frame 37, as described and shown, for the purpose specified.

MELVILLE THOMSON NEALE.

Witnesses:
W. E. BAGNALL,
*Adelphi, London, W. C.*
F. J. BROUGHAM,
*Clerk to Mr. W. Lloyd Wise,
Patent Agent, London.*